(12) United States Patent
Savolainen

(10) Patent No.: US 8,392,613 B2
(45) Date of Patent: Mar. 5, 2013

(54) NETWORK ADDRESS ASSIGNMENT

(75) Inventor: Teemu Ilmari Savolainen, Nokia (FI)

(73) Assignee: Nokia Corporation, Espoo (FI)

( * ) Notice: Subject to any disclaimer, the term of this patent is extended or adjusted under 35 U.S.C. 154(b) by 495 days.

(21) Appl. No.: 12/217,501

(22) Filed: Jul. 3, 2008

(65) Prior Publication Data

US 2010/0005158 A1 Jan. 7, 2010

(51) Int. Cl.
*G06F 15/16* (2006.01)
(52) U.S. Cl. .................................. 709/245; 709/228
(58) Field of Classification Search .................. 709/245, 709/220–223, 224, 226, 217
See application file for complete search history.

(56) References Cited

U.S. PATENT DOCUMENTS

| | | | |
|---|---|---|---|
| 6,192,051 B1* | 2/2001 | Lipman et al. | 370/389 |
| 6,625,652 B1* | 9/2003 | Miller et al. | 709/227 |
| 6,792,051 B1* | 9/2004 | Mohan et al. | 375/324 |
| 7,281,059 B2* | 10/2007 | Ryu et al. | 709/245 |
| 7,672,289 B2* | 3/2010 | Bhatti | 370/349 |
| 7,924,789 B1* | 4/2011 | Breau et al. | 370/331 |
| 2003/0053441 A1* | 3/2003 | Banerjee | 370/352 |
| 2004/0111640 A1 | 6/2004 | Baum | |
| 2005/0066035 A1* | 3/2005 | Williams et al. | 709/226 |
| 2005/0165917 A1* | 7/2005 | Le et al. | 709/220 |
| 2005/0265354 A1* | 12/2005 | Ryu | 370/395.52 |
| 2008/0159289 A1* | 7/2008 | Narayanan et al. | 370/392 |
| 2009/0006596 A1* | 1/2009 | Dinakaran et al. | 709/223 |
| 2009/0248800 A1* | 10/2009 | Chu et al. | 709/204 |
| 2010/0246381 A1* | 9/2010 | Sendra Alcina et al. | 370/216 |
| 2010/0325247 A1* | 12/2010 | Levkowetz | 709/220 |

FOREIGN PATENT DOCUMENTS

| | | |
|---|---|---|
| WO | WO/00/78002 | 12/2000 |
| WO | WO/2005/067265 | 7/2005 |
| WO | WO/2008/057019 | 5/2008 |

OTHER PUBLICATIONS

1997, Droms, Dynamic Host Configuration Protocol, RFC 2131, Mar. 1997, pp. 1-43, http://www.ietf.org/rfc/rfc2131.txt.
2008, Fuller et al., Reclassifying 240/4 as usable unicast address space, Internet-Draft, Mar. 2008, pp. 1-6, http://tools.ietf.org/internet-drafts/draft-fuller-240space-02.
1992, McGregor, The PPP Internet Protocol Control Protocol (IPCP), RFC 1332, May 1992, pp. 1-14, http://www.ietf.org/rfc/rfc1332.txt.
2002, Perkins, IP Mobility Support for IPv4, RFC 3344, Aug. 2002, pp. 1-9, http://www.ietf.org/rfc/rfc3344.txt.
1996, Rekhter et al., Address Allocation for Private Internets, RFC1918, Feb. 1996, pp. 1-9, http://www.ietf.org/rfc/rfc1918.txt.
2007, Wilson et al., Redesignation of 240/4 from "Future Use" to "Limited Use for Large Private Internets", Internet-Draft, Aug. 2007, pp. 1-4, http://tools.ietf.org/internet-drafts/draft-wilson-class-e-01.
2003, 3GPP TS 24.008, pp. 1-483, http://www.3gpp.org/ftp/Specs/ftml-info/24008.htm.
2008, Soliman, Mobile IPv6 Support for Dual Stack Hosts and Routers, Internet-Draft, Jun. 2008, pp. 1-49, http://tools.ietf.org/pdf/draft-ietf-mext-nemo-v4traversal-04.txt.

* cited by examiner

*Primary Examiner* — Abdullahi Salad
(74) *Attorney, Agent, or Firm* — Harrington & Smith

(57) ABSTRACT

In a non-limiting and exemplary embodiment, a method is provided for network address assignment. A network address request is received with an indication of a specific network address space. A network address belonging to the specific network address space may be assigned in response to detecting the indication in the received request. A response to the network address request is transmitted, the response indicating the assigned network address.

7 Claims, 4 Drawing Sheets

NETWORK ADDRESS ASSIGNMENT

FIELD

The present invention relates to network address assignment.

BACKGROUND

Internet Protocol (IP) is the backbone of modern networking and supported in most of the current telecommunications devices. IP is adaptable and has been extended to provide additional functionality.

IETF has defined private IP version 4 IPv4 address space in RFC 1918. This includes the following address spaces: 10.0.0.0-10.255.255.255, 172.16.0.0-172.31.255.255, 192.168.0.0-192.168.255.255. As the public IPv4 address space is nearing exhaustion, it is very common to use this private address space with Network Address Translation NAT to increase number of hosts that can be supported with limited number of public IPv4 addresses.

However, RFC 1918 specified address space allows only ~17 million hosts behind single NAT. Historically this has not been a problem as networks so large have not existed. This is currently changing, as more and more operators are having more than 17 million simultaneous hosts connected into their network. In order to support a large number of customers, there needs to be multiple instances of private address spaces within a single operator domain (if the operator does not have enough public IPv4 addresses). This causes a need for cascaded NATs, which increase complexity and cost of network operations. IP version 6 IPv6 provides a large number of addresses, but IPv4 needs to be supported for a long time.

An address block spanning 240.0.0.0 to 255.255.255.255 (240.0.0.0/4), formerly designated as Class E is currently defined as being 'Reserved' in the Internet Assigned Numbers Authority IANA IPv4 address registry. There has been discussion on future use of this address space. The options include 1) keep the address space reserved for the future, 2) make the address space public, or 3) make the address space private. The third option would ease the problem of having multiple parallel private address spaces caused by too small address space defined by RFC 1918, and is proposed in IETF standardization. However, many existing implementations do not support or prevent use of this address space. An allocation of an address belonging to the 240.0.0.0 space for such implementation would result in failure.

Brief Description

Methods, apparatuses, and computer program products are now provided, which are characterized by what is stated in the independent claims. Some embodiments of the invention are described in the dependent claims.

According to an aspect of the invention, there is provided a method and apparatus for requesting assignment of a network address: a network address request with an indication of a specific network address space is generated in an address requesting entity to inform of capability of the address requesting entity to use a network address belonging to the specific network address space. The network address request is transmitted to an entity assigning network addresses. A response to the network address request is received, the response indicating the assigned network address belonging to the network address space.

According to another aspect, there is provided a method and apparatus for network address assignment: After receiving a network address request with an indication of a specific network address space, assignment of a network address belonging to the specific network address space is allowed in response to detecting the indication in the received network address request. A response to the network address request is transmitted, the response indicating the assigned network address. The specific network address space is to be understood broadly to cover some particular set of network addresses and is not limited e.g. to the IPv4 240.0.0.0/4 address space.

The invention and various embodiments of the invention provide several advantages, which will become apparent from the detailed description below. One advantage of an aspect of the invention is that it becomes possible to achieve backward compatibility with devices not supporting the specific network address space, such as the 240.0.0.0/4 IP address space. Problems caused by assigning addresses to conventional hosts not supporting use of addresses belonging to the specific network address space may be avoided. Network address assigning entities can thus assign addresses belonging to the specific network address space only for hosts verified to support the use of addresses belonging to the specific network address space.

LIST OF DRAWINGS

Embodiments of the present invention are described below, by way of example only, with reference to the accompanying drawings, in which FIG. 1 illustrates a communications system;

DESCRIPTION OF EMBODIMENTS

Figure 1:
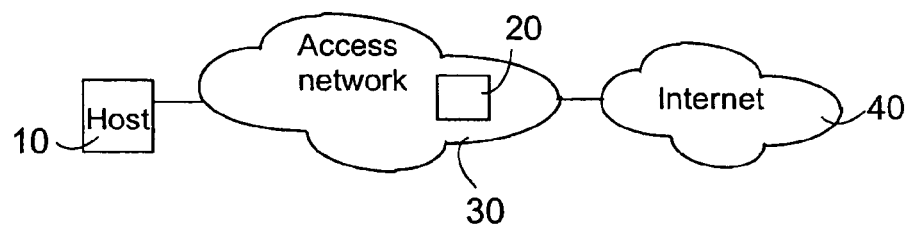

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

An embodiment of the invention will be illustrated in the following with reference to the IP communications system in FIG. 1. However, the application of the present network address assignment related features is not limited to any particular network configuration or network protocol. A host 10 connects an access network 30, which comprises or is connected to an IP address assigning entity 20. The access network 30 may be connected to the Internet 40 directly or via other networks. The IP address assigning entity or assignor 20 may be a dynamic host configuration protocol (DHCP) server or a node of a packet radio system assigning addresses for mobile hosts, for instance. The address assigning entity 20 may be a point-to-point server, to which a plurality of hosts 10 connects to over a point-to-point link or a tunneled connection, for instance. In case of a tunneling configuration, the entity 20 may be the end point for the tunnel from the host 10. The tunnel may be an IPv4 over IPv6 tunnel or a virtual private network (VPN) tunnel, for instance. It is to be noted that there may be various further entities not illustrated in FIG. 1, such as firewalls and various access network elements. It is to be also noted that the host 10 may provide access for one or more further devices behind it.

The host 10 requests a network address from the address assigning entity 20 and then takes into use an address assigned by and returned from the entity 20.

An improved IP address assignment arrangement has now been developed in which the host 10 is arranged to request an IP address with an indication of a specific network address space or block, in one embodiment the Class E space of 240.0.0.0 to 255.255.255.255 (240.0.0.0/4). In one embodiment the indication is a specific address agreed to indicate the network address space. Thus, a field reserved for requesting a specific network address may be used to deliver this indication and no new fields need to be specified. The assignor 20 is arranged to detect the indication of the specific network address space and arranged to allow for the host 10 assignment of an IP address belonging to the specific network address space indicated in the received network address request.

This alleviates the commissioning of the new address space, which many existing host implementations cannot use. Network address assigning entities can assign addresses belonging to the specific network address space only for hosts including the indication in network address requests and thus being verified to support such addresses. If not verified, the assigning entity 20 may assign addresses for conventional hosts in conventional fashion.

Further backward-compatibility may be achieved, since the indication may be arranged such that network address assigning entities not supporting assignment of addresses belonging to the specific network address space may simply ignore the indication and assign an address in conventional fashion. Operators can start to deploy 240.0.0.0/4 address space without needing to test and replace existing and potentially non-compliant devices on the field. The use of the 240.0.0.0/4 address space can be introduced to hosts and networks elements at different times and transition to IPv6 can be smoothened.

Figure 2A:
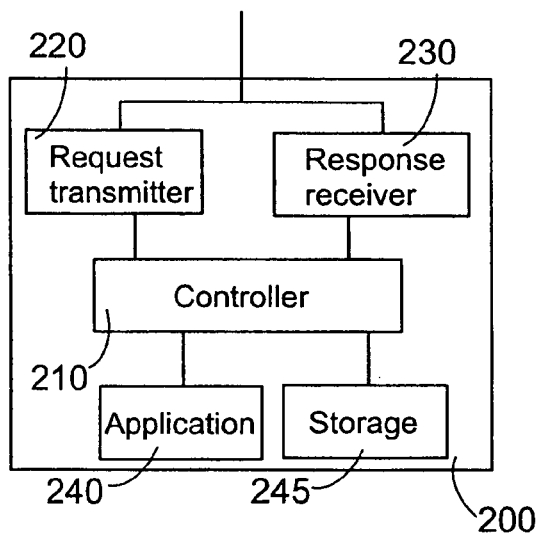
FIGS. 2a and 2b illustrate apparatuses according to an embodiment.

FIG. 2a illustrates a simplified block diagram of an apparatus 200 according to an embodiment. The apparatus 200 may be configured to function as the host 10 of FIG. 1. The apparatus 200 comprises a manager or controller 210, a request transmitter 220, a response receiver 230, one or more applications 240 and storage 245. The request transmitter 220 is used at least to transmit the IP address assignment request and the response receiver 230 is used at least to receive the IP address assignment response. The request transmitter 220 and the response receiver 230 may be provided by one or more communications modules. Alternatively, they may be provided by a controller apparatus connected to a transceiver.

The controller 210 controls IP related communications, at least IP address acquisition related communications. The controller 210 controls the generation of an IP address assignment request and may control use of an IP address belonging to the specific address space and received in a network address assignment response via the response receiver 230. The controller 210 may be configured to implement or control at least an IP layer protocol instance utilizing lower-layer data link layer protocol for arranging transmission and reception of IP packets. The controller 210 may store the received IP address to the storage 245.

The apparatus 2a comprises not only prior art means, but also means for arranging request for an IP address belonging to the specific address block. In particular, means may be provided for arranging at least some of the features illustrated in connection with FIGS. 3 and 5 to 8.

The apparatus 200 may be any communications device capable of supporting IP communications, such as a mobile device roaming between and connected to a plurality of access networks. Examples of a communications device include a personal computer, an entertainment device such as a game console, a laptop, or a personal digital assistant with IP networking capability, an embedded computing device or a mobile station (mobile phone). In case of a mobile communications device comprising typically a plurality of transceivers for wireless communications, a wireless connection may be implemented with a wireless transceiver operating according to the GSM (Global System for Mobile Communications), WCDMA (Wideband Code Division Multiple Access), a network operating on non-licensed frequencies, such as WLAN (Wireless Local Area Network) or WiMAX (Wireless Metropolitan Area Network), or any other suitable standard/non-standard wireless communication means.

Figure 2B:
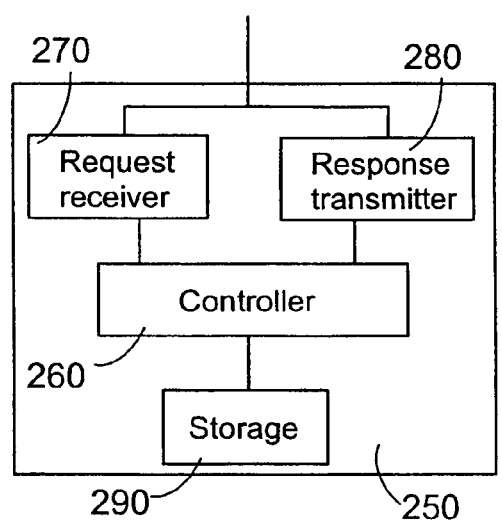

FIG. 2b illustrates a simplified block diagram of an apparatus 250 according to an embodiment. The apparatus 250 may be configured to function as the IP address assigning entity 20 of FIG. 1. The apparatus 250 comprises a manager or controller 260, a request receiver 270 for receiving an address assignment request, a response transmitter 280 for transmitting an address assignment response, and storage 290 for storing address assignment related configuration data. The request receiver 270 and the response transmitter 280 may be provided by one or more communications modules or by a controller apparatus connected to a transceiver, for instance.

The controller 260 controls at least IP address assignment on the basis of analyzing a received address assignment request. The controller 260 also controls the generation of an IP address assignment response to inform the host about an assigned address. The apparatus 250 comprises not only prior art means, but also means for arranging assignment of network addresses belonging to the specific address block in response to detecting the indication of the specific address block in a received IP address assignment request. In particular, means may be provided for arranging at least some of the features illustrated in connection with FIGS. 4 to 8.

Some further embodiments of features for the apparatus 200, 250 and in particular for the controllers 210, 260 are illustrated below in connection with FIGS. 3 to 8. It should be appreciated that the apparatuses may comprise other units. However, they are irrelevant to the present embodiments and, therefore, they need not to be discussed in more detail here.

Although the apparatus 200, 250 has been depicted as a single entity, different modules and memory may be implemented in one or more physical or logical entities. Although the modules are functionally separated in FIGS. 2a and 2b, at least some of these functions could be implemented in a single unit or module. Further, there could be an apparatus implementing only one of these modules.

The apparatus 200, 250 could be in a form of a chip unit or some other kind of hardware module for controlling a data processing device. Such hardware module comprises connecting means for connecting the data processing device mechanically and/or functionally. Thus, the hardware module may form part of the device and could be removable. Some examples of such hardware module are a sub-assembly or an accessory device. For instance, all or some of the modules in FIGS. 2a, 2b, such as the controller 210, 260, could be a single physical entity operationally connectable to other modules of FIG. 2a, 2b. Such apparatus providing the controller 210 could be a chipset or an integrated circuit suitable for use in a mobile station or a portable computer.

The apparatus 200, 250 may be implemented as an electronic digital computer, which may comprise memory, a central processing unit (CPU), and a system clock. The CPU may comprise a set of registers, an arithmetic logic unit, and a control unit. The control unit is controlled by a sequence of program instructions transferred to the CPU from the memory. The program instructions may be coded by a programming language, which may be a high-level programming language, or a low-level programming language, such as a machine language, or an assembler.

An embodiment provides a computer program embodied on a distribution medium, comprising program instructions which, when loaded into an electronic apparatus, constitute one or more of the modules in FIGS. 2a, 2b. Such computer program may include program code for controlling the apparatus to perform at least some of the address assignment request and/or assignment related functions illustrated below in connection with FIGS. 3 to 8. The computer program may be in source code form, object code form, or in some intermediate form, and it may be stored in some carrier, which may be any entity or device capable of carrying the program. Such carriers include a record medium, computer memory, read-only memory, electrical carrier signal, telecommunications signal, and software distribution package, for example. In one further embodiment the present IP address request and/or assignment control features are implemented by operating system software, or as part of communications software implementing IP communications.

The apparatus 200, 250 or the modules thereof may also be implemented as one or more integrated circuits, such as application-specific integrated circuits ASIC. Other hardware embodiments are also feasible, such as a circuit built of separate logic components. A hybrid of these different implementations is also feasible.

Figure 3:
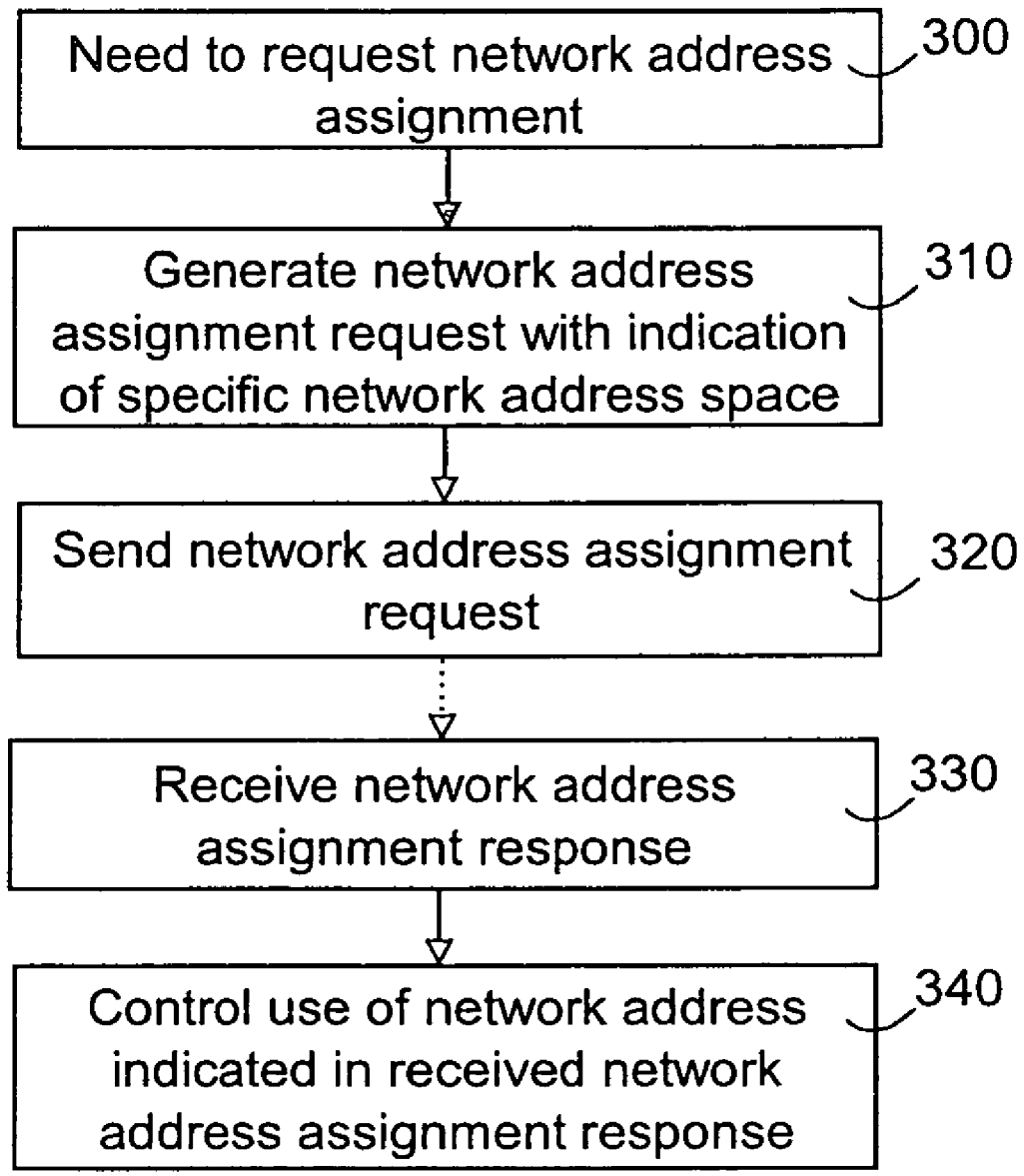
FIG. 3 illustrates a method according to an embodiment.

FIG. 3 illustrates a method according to an embodiment. The method may be applied in the host 10 or by the apparatus 200, for instance.

A need to request a network address belonging to a specific network address space or in general to request dynamic assignment of a network address is detected 300. This step may be generally entered when establishing a connection for an application 240.

A network address request with an indication of the specific network address space, such as the 240.0.0.0/4 IP address space, is generated 310 to inform of capability to use a network address belonging to the specific network address space. Thus, the indication is included in response to the capability of the address requesting entity to use an address belonging to the specific network address space. The indication may be included in all network address requests automatically, or selectively only for some requests on the basis of a predetermined setting. The network address request is transmitted 320 to an entity assigning network addresses.

Later, a response to the network address request is received 330. The assigned address is checked in the response. The assigned address is used 340 for addressing a communications flow of or via the node applying the method of FIG. 3. If the address assignment entity to which the request was sent supports present address assignment procedure, as further illustrated in FIG. 4, the assigned network address may belong to the specific address space.

Figure 4:
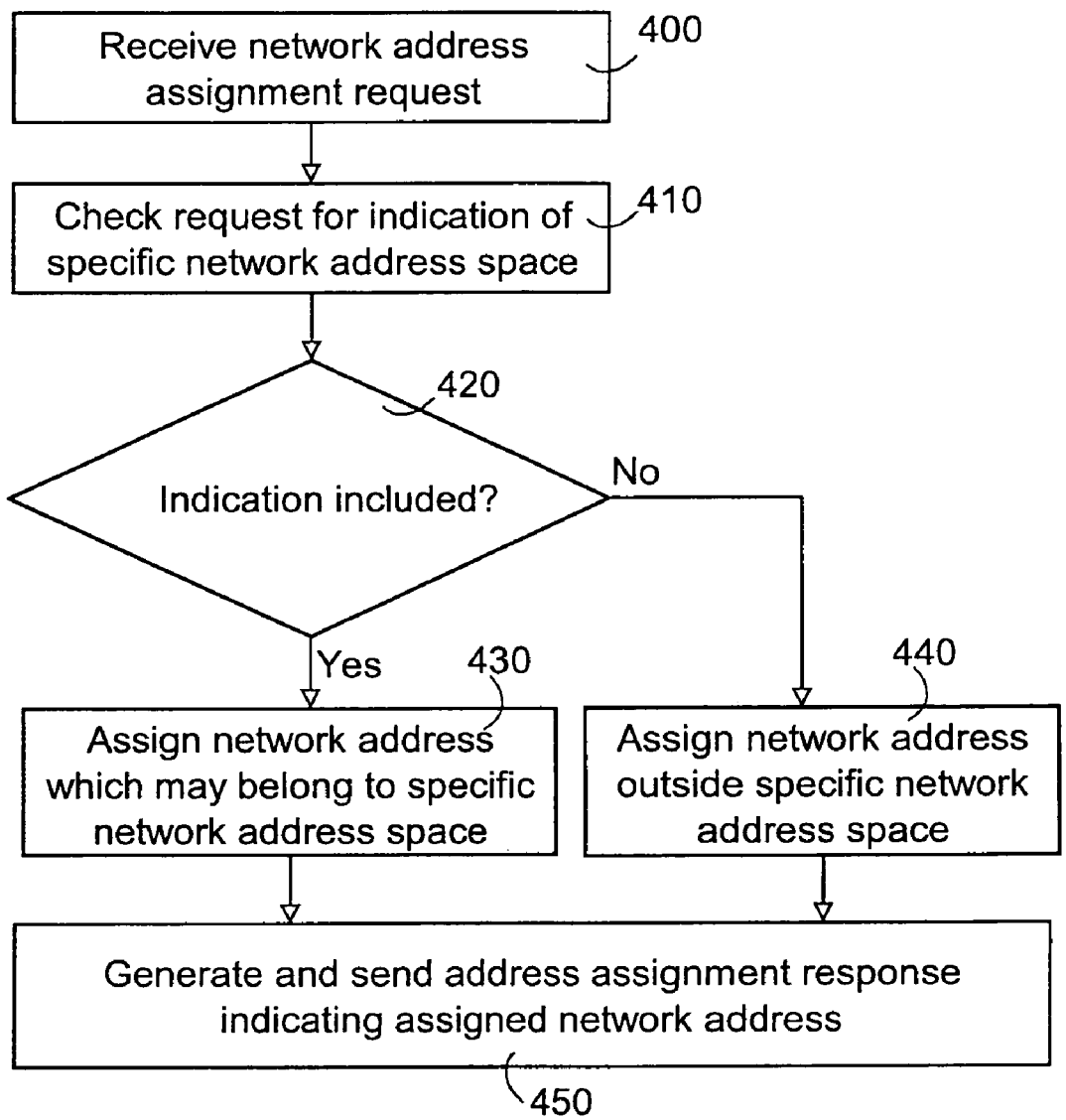
FIG. 4 illustrates a method according to an embodiment.

FIG. 4 illustrates a method according to an embodiment. The method may be applied in the IP address assignment entity 20 or by the apparatus 250, for instance. A network address request is received 400. The request is checked 410, 420 for an indication of the specific network address space, such as the 240.0.0.0/4 IP address space.

If an indication of the specific network address space is detected, a network address belonging to the specific network address space indicated in the received network address request may be assigned 430. Hence, the address assigning entity is permitted to assign an address belonging to the specific network address space. The selection whether to assign the address inside or outside the specific network address space may be determined by operator-controllable configuration setting, adjustable on the basis of the number of used IP addresses, for instance.

If an indication of the specific network address space is not detected, the requesting entity is considered not to support the specific network address space. Thus, a network address outside the specific network address space is assigned 440. In other words, allocation of an address belonging to the specific network address space is prevented.

A network address assignment response indicating the assigned network address is generated and sent 450 to the requesting entity.

In one embodiment, as already indicated, the specific network address space is the IP address space of 240.0.0.0 to 255.255.255.255 (240.0.0.0/4).

In one embodiment the indication of the 240.0.0.0/4 address space designates a predefined identifier or address agreed to represent the 240.0.0.0/4 address space or domain. A field of an IP address assignment related message reserved for a requested address may be used to deliver the indication to the assigning entity 20.

In a further embodiment, the host 10 is arranged to include (310) value '240.0.0.0' in the address assignment request. The assigning entity 20 is thus arranged to assign an address belonging to the 240.0.0.0/4 address space in response to detecting (420) such indication in a received request.

In one embodiment network address translation NAT between the network address belonging to the specific address space and an address outside the specific network address space is launched in or for an intermediate networking device, such as the host 10. Such intermediate device may be any kind of device providing access for one or more local devices. The intermediate device may provide point-to-point connection(s) or a network service for a local area network. For instance, a consumer premises equipment (CPE) or a cellular router having point-to-point or tunneled connectivity to Internet may have additional local devices behind it.

However, in one embodiment the intermediate device is an access router potentially serving a large number of access devices, such as a dial-up networking server or a node of a packet radio system. Hence, also the address assigning entity 20 may be arranged to apply NAT if necessary.

There may be other devices behind the intermediate device, which do not necessarily support the specific address space, such as computers with old operating system versions. Thus, by applying NAT, the use of the address belonging to the specific address space may be hidden from the devices behind the intermediate device. For instance, the NAT may be arranged in a dial-up situation or a network sharing situation.

In one embodiment NAT is established in response to receiving the network address belonging to the-specific address space, for instance in step 340. A NAT may be arranged in response to detecting that a terminal device requesting connection via the host 10 does not support the use of the specific network address space.

In case of the 240.0.0.0/4 address space, the host 10 may launch a NAT between the 240-address obtained from the network and an address belonging to a conventionally used private address space in accordance with the RFC 1918. If the network does not return an address belonging to the 240.0.0.0/4 address space, the host 10 can give the address directly to a dialup machine. The host 10 may be configured to always launch a NAT for devices behind it, or only when an IP address is being assigned from the 240.0.0.0/4 address space.

In one embodiment an intermediary device capable of using addresses of the specific address space is arranged to intercept a network address request and include the indication of the specific network address in the IP address request to replace the original IP address in the request. The intermediary device may then launch NAT in response to receiving an address belonging to the specific address space. A further example is set out below.

A wired or wireless modem may function as the host 10 and provide network access for an end user computer, for instance a PC, a personal digital assistant PDA or a laptop. The modem may be arranged to interfere with the computer's request for an IP address. The modem could modify the computer's IP address request by replacing the 0.0.0.0 address with 240.0.0.0 in order to indicate support for 240.0.0.0/4 addresses towards a server, which may function as the entity 20 of FIG. 2. If the server then provides an address from the 240.0.0.0/4 address space, the modem would need to initiate its IP stack and configure the address obtained from the server for itself, instantiate NAT, and allocate an IP address from the (RFC1918) private address space for the computer. If the server provides a non-240.0.0.0/4 address even when support for 240.0.0.0/4 was indicated, the modem may pass it to the computer unmodified.

Figure 5:
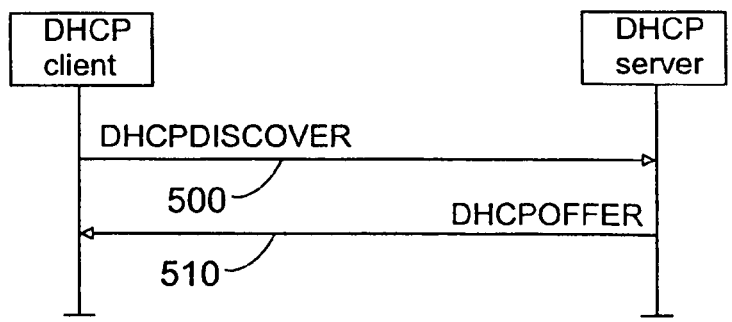
FIGS. 5 to 8 are signaling diagrams according to some embodiments.

In one embodiment, dynamic host configuration protocol DHCP is used for the address assignment. Reference is now made to FIG. 5. In one embodiment the indication is included in DHCPDISCOVER message 500 from a DHCP client to a DHCP server. The indication may be included in the message 500 in the Requested IP Address option as a predefined specific address representing the 240.0.0.0/4 address space, for instance. The DHCP server supporting the present IP address assignment features detects the indication and assigns an IP address belonging to the 240.0.0.0/4 address space. The DHCP server returns the assigned IP address in DHCPOFFER message 510. For further details on DHCP, reference is made to the IETF DHCP specification RFC 2131, R. Droms, March 1997, incorporated herein as reference. The client-server protocol is described in Section 3.

Figure 6:
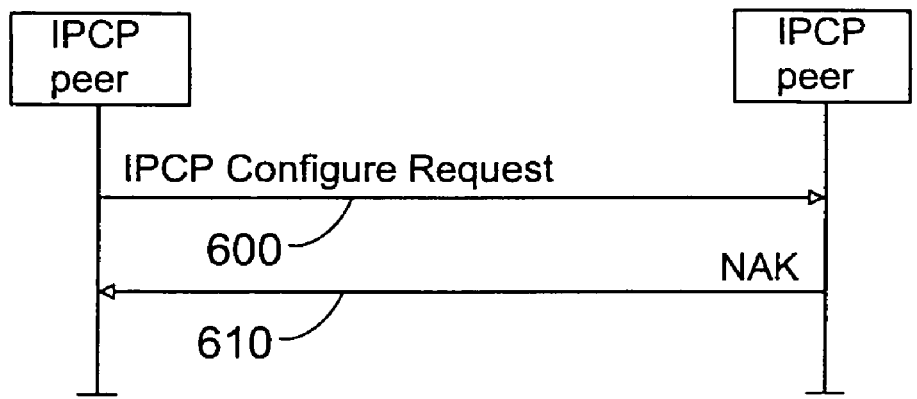

In one embodiment, a Point-to-Point Protocol PPP Internet Protocol Control Protocol IPCP is utilized for the address assignment on PPP links. Referring to FIG. 6, an IPCP peer requesting address assignment over PPP link may include an indication of the specific network address space in IPCP configuration request 600, and in particular in an IP address option field. An IPCP peer receiving the request may return 610 a negative acknowledgement (NAK) including the assigned address from the specific address domain.

For further details on the IPCP, reference is made to the IETF specification RFC 1332, G. McGregor, May 1992, incorporated herein as reference. IP address configuration option is described in Section 3.3.

In one embodiment at least some of the above illustrated features are applied for network address assignment in a packet radio system. The indication of the specific network address space may be included in a packet data protocol context request to a node of a packet radio system. The present features are especially useful for cellular network access, where a multitude of different implementations of different ages can connect to an operator's network.

The packet radio system may be a general packet radio service GPRS specified by the Third Generation Partnership Project (3GPP), for instance. However, application of the present features is not limited to any specific packet radio system or standard.

Figure 7:
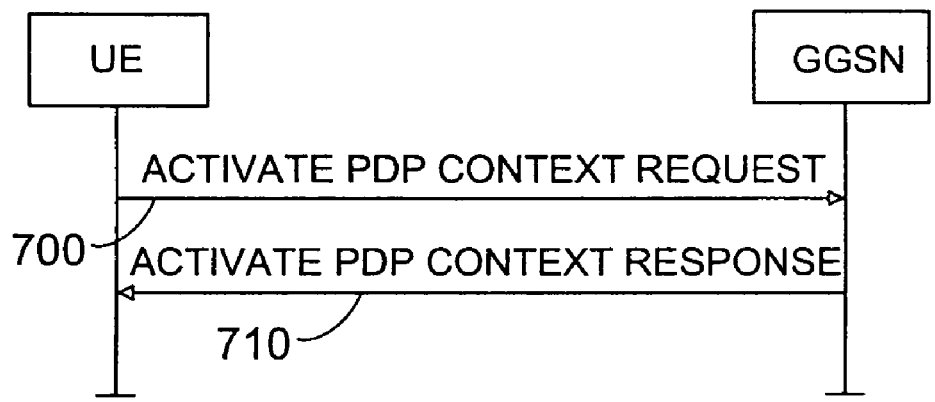

FIG. 7 illustrates messages related to establishment of a packet data protocol PDP context for user equipment UE, which may be the host 10 in FIG. 1. The UE is arranged to include the indication of the specific network address space in a PDP context activation request 700 to a gateway GPRS support node (GGSN). In particular, the indication may be included in PDP address option section Requested PDP Address. In a further embodiment the predefined value '240.0.0.0' is included.

The GGSN may function as the IP address assigning entity 20 and allocate an address belonging to the specific address space in response to detecting the indication in the PDP context activation request 700. The GGSN returns the assigned address in an activate PDP context response message 710. Further information on the PDP context establishment related message exchange is available in 3GPP specification TS 24.008 on mobile radio interface layer 3 and core network protocols, version 8.2.0 (2008-06) of the 3GPP TS 24.008 being incorporated herein as reference. In particular, reference is made to Section 6 ("Support for packet services" in version 8.2.0) and to Section 9.5 on "GPRS Session Management Messages".

Similarly to the above illustrated PDP context establishment related messaging, the indication of the specific network address space may be included in a System Architecture Evolution SAE Evolved Packet System EPS bearer establishment related messaging.

Figure 8:
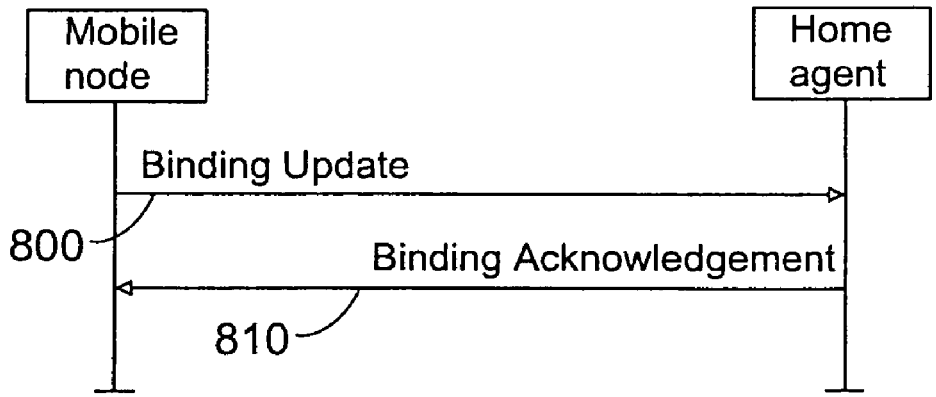

In one embodiment the indication of the specific address space is transmitted in a Mobile IP (MIP) message, such as a Mobile IPv4 registration request or Mobile IPv6 binding update message. FIG. 8 illustrates an embodiment of a dual stack MIP arrangement, where a mobile node MN includes the indication in a binding update message 800 to a MIP home agent HA. In a further embodiment the predefined value '240.0.0.0' is included. In one further embodiment the indication is included in an IPv4 Home Address Option extension used for requesting IPv4 home address. The HA may assign an address belonging to the specific address space in response to detecting the indication. The HA returns the assigned address in a Binding Acknowledgment message 810.

For further information on dual stack Mobile IP systems, reference is made to IETF Internet Draft *"Mobile IPv6 Support for Dual Stack Hosts and Routers"*, draft-ietf-mext-nemo-v4traversal-04.txt, H. Soliman ed., Jun. 10, 2008, incorporated herein as reference.

In all of the above cases, if the address assigning entity 20, such as the peer, server, GGSN, or home agent, does not support the use of the new private 240.0.0.0/4 addresses, or if operator's network (30) does not support such addresses, it will ignore host's 10 request and reply with a public or private RFC 1918 IPv4 address. Thus, both host and server implementation can be fully backward compatible. If the host 10 does not indicate support for 240.0.0.0/4 addresses, the address assigning entity 20 shall assign an address from public or private RFC 1918 pool.

In one embodiment the address assigning entity 20 may exceptionally allow allocation of addresses belonging to the specific address space even if the indication would not be received (step 440 of FIG. 4). This exception may be triggered if the assigning entity 20 has or is close to running out of public and private (RFC 1918) IPv4 addresses. Thus, in response to detecting such triggering condition, the assigning entity 20 may automatically change to offer a 240.0.0.0/4 address for the host 10 even if the host 10 did not indicate support for 240.0.0.0/4 addresses. This embodiment enables to improve service availability and capacity when the services of the assigning entity 20 are being used by a high number of legacy devices.

The above illustrated features are merely some examples of available features for arranging address assignment within the specific address space, and other current and future mechanisms may be used. For instance, at least some of the above illustrated features may be applied in connection with an Internet key exchange IKE or IKE version 2 protocol, or in connection with a Virtual Private Network VPN protocol. Furthermore, instead of a system using IPv4 address space illustrated above, some other current or future network address space, such as IPv6 address space, may be applied.

It will be obvious to a person skilled in the art that, as technology advances, the inventive concept can be implemented in various ways. The invention and its embodiments are not limited to the examples described above but may vary within the scope of the claims. The features of the embodiments described herein may be combined in all possible combinations of methods, apparatuses, modules, systems, and computer program products. The combinations of claim elements as stated in the claims can be changed in a number of different ways and still be within the scope of various embodiments of the invention.

The invention claimed is:

1. A method comprising:
generating a network address request with an indication of a specific network address space to inform of capability to use a network address belonging to the specific network address space, where the indication is arranged as a predefined address included in a field reserved for a requested address;
transmitting the network address request to an entity assigning network addresses;
receiving a response to the network address request, the response indicating the assigned network address belonging to the network address space, and
arranging network address translation between the network address belonging to the specific network address space and an address outside the specific network address space in an intermediate networking device in response to detecting that a terminal device requesting connection via the intermediate networking device does not support the use of the specific network address space.

2. The method of claim 1, wherein the network address space is an Internet Protocol version 4 address space of 240.0.0.0 to 255.255.255.255.

3. An apparatus comprising a controller, and memory including computer program code, the memory and the computer program code configured to, with the controller, cause the apparatus at least to generate a network address request with an indication of a specific network address space for informing of a capability to use a network address belonging to the specific network address space and include the indication as a predefined address in a field reserved for a requested address, for transmission to an entity assigning network addresses, wherein the apparatus is further configured to arrange network address translation between the network address belonging to the specific network address space and an address outside the specific network address space in response to detecting that a terminal device served by the apparatus does not support the use of the specific network address space.

4. The apparatus of claim 3, wherein the network address space is an Internet Protocol version 4 address space of 240.0.0.0 to 255.255.255.255.

5. The apparatus of claim 3, wherein the apparatus is a mobile communications terminal device.

6. The apparatus of claim 3, wherein the apparatus is a chipset for a communications device.

7. A non-transitory computer-readable medium comprising a computer program product encoding a computer process for use in a communications device, the computer process comprising:
generating a network address request with an indication of a specific network address space to inform of capability to use a network address belonging to the specific network address space, where the indication is arranged as a predefined address included in a field reserved for a requested address;
transmitting the network address request to an entity assigning network addresses;
receiving a response to the network address request, the response indicating the assigned network address belonging to the network address space, and
arranging network address translation between the network address belonging to the specific network address space and an address outside the specific network address space in response to detecting that a terminal device using the assigned network address does not support the use of the specific network address space.

* * * * *